Jan. 23, 1962      W. G. MIKELL      3,017,669
TIRE CORD STRESS EQUALIZATION PROCESS
Filed June 20, 1957
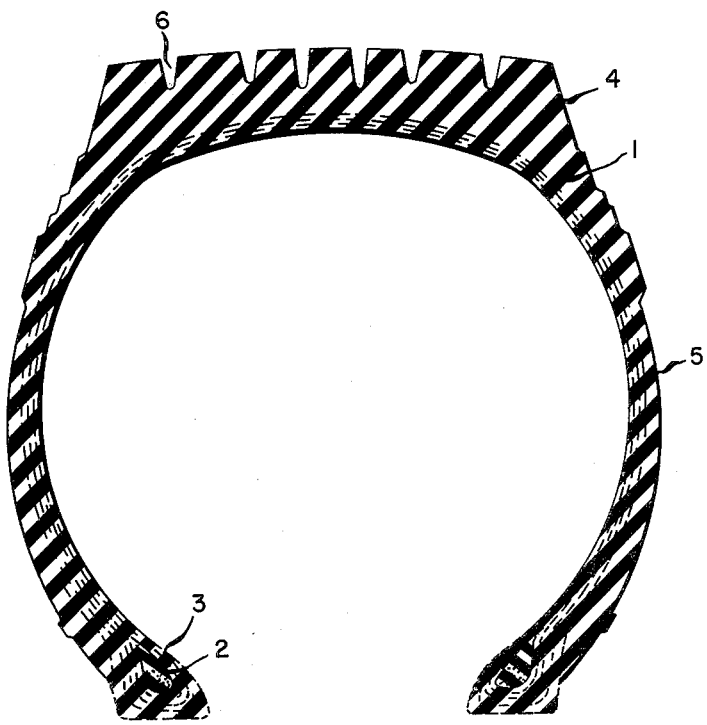
INVENTOR
WILLIAM G. MIKELL
BY *Carl A. Hechmer*
ATTORNEY

United States Patent Office 3,017,669
Patented Jan. 23, 1962

3,017,669
TIRE CORD STRESS EQUALIZATION PROCESS
William G. Mikell, Wilmington, Del., assignor to E. I. du Pont de Nemours and Company, Wilmington, Del., a corporation of Delaware
Filed June 20, 1957, Ser. No. 666,998
1 Claim. (Cl. 18—53)

This invention relates to a novel and useful process. More specifically, it is concerned with a process for improving the ride performance of a tire.

The manufacture of a tire involves the molding of various heterogeneous elements, such as rubber stock, cord fabric, and wire bead, into a unitary, coherent structure. In conventional operation the various elements are first assembled on a drum, and thereafter the assembly is placed in a mold where shaping takes place and to which heat is applied to effect vulcanization of the rubber. Vulcanization causes a hardening or "curing" of the rubber stock and adherence of the rubber to the cord and bead structures embedded within it. Due to the forces operating upon the structure during tire fabrication and vulcanization, various unbalancing influences, usually not visually perceptible in the finished product, occur when the tire is inflated and mounted on the automobile. This results in a phenomenon known in the trade as tire "thump," i.e., a ride subject to vibrations and acoustical noise particularly acute at frequencies peculiar to each tire. Because of manufacturing non-uniformities, the rotating tire can be a source of vibrations and noises. Tire thump is a cyclic train of vibrations and sounds that has the same period as the revolutions of the tire. Thus, thump is impressed upon the observer as originating in the tire. While tires with heat shrinkable cords of linear synthetic polymer, such as nylon, are subject to less intense thump than those made with cotton or rayon cord, nevertheless, the advent of smoother riding and quieter automobiles has focused attention upon this problem.

It is an object of the present invention to provide a process for the treatment of tires for the elimination or minimizing of thump.

Another object is to provide a tire of equalized internal stress.

These and other objects will become apparent in the course of the following specification and claim.

The invention will be more readily understood by reference to the illustration showing the sectional elevation of a 4-ply tire. In the manufacture of such a tire the carcass is built upon a tire building drum, starting with four layers of rubber-coated, bias-cut fabric 1. A bundle of wire beads 2 wrapped in a chafing fabric or "flipper strip" 3 is wound around each end of the said drum over fabric plies 1, the ends of the said fabric plies then being folded around the said "flipper strips" so as to encase them. Tread material 4, produced by extrusion of rubber stock containing suitable anti-oxidants, accelerators, and the like, and shaped to form side walls 5 and grooved anti-skid riding surface 6, is then applied to the drum borne assembly. The drum assembled structure is thereafter placed in a suitable shaping mold. An inflated bag shapes it against the mold cavity to provide the desired shape during the cooling operation. The shaped product has the cross section as represented.

In accordance with the present invention, a process is provided wherein an unconfined, vulcanized tire, containing cord, which is preferably heat-shrinkable, is subjected to a temperature sufficiently high to permit stress equalization of the said cord, but below the temperature at which substantial decomposition of any component of the said tire occurs and cooling the said tire after the said equalization.

By being "unconfined" is meant that during the process of the present invention the tire carcass is free from forces, which cause constraining of the cords, such as occurs due to the confinement of the mold. Although heating may be applied to the unconfined structure prior to the completion of the curing operation, it is essential that the heating of the structure be continued for a period after vulcanization is complete to permit stress equalization of the cord. Preferably the curing bag is removed from the tire following vulcanization before the additional heating period. As mentioned previously, the vulcanization operation not only results in a hardening of the rubber but also in adhesion of the rubber and fabric components. Due to the unequal cross section of the carcass body, this adherence of rubber to fabric progresses unequally. Thus, the thermal shrinkage which occurs in the fabric is distributed unequally over the fiber length. It is, therefore, necessary that the stress equalization process of the present invention be applied to the tire after vulcanization is complete.

While the process of the present invention is applicable to tires produced with any type of fabric, it is particularly adaptable to tires containing heat-shrinkable cords, i.e., cords produced from linear synthetic polymers, such as nylon, polyethylene terephthalate, and the like. As illustrated herein, such cords are particularly adaptable to stress equalization by thermal means. The ride performance of tires with cords of regenerated cellulose, cellulose derivatives, and the like, is also improved by the process of the present invention.

The following example is cited to illustrate the invention. It is not intended to limit it in any manner.

Example

Four 4-ply size 8.00–15 tires, each containing nylon cord (840 denier multifilament 2-ply yarn of polyhexamethylene adipamide), are selected from a manufacturer's assembly line on the basis of their poor ride performance. Twenty pounds of crude rubber and 2 pounds of cord are employed in the construction of each tire, the tire tread and sidewall weight being seventeen pounds. The carcass is built on a drum using conventional bias-cut nylon fabric, and curing is on a "Bag-O-Matic" press using a bladder temperature of 380° F., a platen temperature of 320° F. for a total time of twenty-eight minutes, which includes four minutes cooling in the press. Each tire is observed to produce a bad thump even on roads not perfectly smooth. Three of these tires, uninflated, are placed in an oven heated to 350° F. for fifteen minutes. They are then removed and permitted to cool. Upon remounting, two of the heated tires show no thump. The third has a barely detectable thump on smooth asphalt surfaces. The tire whose cord was not stress equalized continues to thump badly. No change in thumping qualities is noted in any tire after extensive operation.

The stress equalization procedure of the present invention requires the temperature of the cord in the tire fabric to be raised to at least about 250° F. after completion of vulcanization. It is preferred that the vulcanized tire be heated at a temperature between about 325° F. and 360° F. for a period of about 15 minutes. A lower temperature may be employed provided the heating period is increased to permit heat penetration of the carcass. The heating may immediately follow the vulcanization operation without an intermediate cooling step, provided the necessary heat is applied to the unconfined structure after vulcanization is complete. The tire may be either inflated or non-inflated. Temperatures at which substantial decomposition of rubber, fabric, or any tire element occurs are, of course, to be avoided. After stress equalization, the tire is permitted to cool.

The nature, size, rubber feed components, and the like of the tire are not critical, provided the tire is a composite rubber/fabric structure of the conventional type adapted for automobile usage. The improvement is noted whether the tire is a tubeless tire or equipped with tubes. The rubber used may be natural or synthetic or a mixture thereof.

Many equivalent modifications will be apparent to those skilled in the art from the reading of the above without a departure from the inventive concept.

What is claimed is:

A process for minimizing the thump of a nylon cord tire which comprises subjecting the said tire, after complete vulcanization and while in an unrestrained condition outside of the tire-forming mold in which it has been shaped and otherwise free of restrictive forces, to a temperature above the vulcanization temperature and between about 325° F. and 360° F. for a period of about 15 minutes and thereafter cooling the said tire.

References Cited in the file of this patent

UNITED STATES PATENTS

| | | |
|---|---|---|
| 2,032,508 | Seiberling et al. | Mar. 3, 1936 |
| 2,320,115 | Young | May 25, 1943 |
| 2,372,630 | Smith | Mar. 27, 1945 |
| 2,592,844 | Antonson | Apr. 15, 1952 |
| 2,790,482 | Riggs | Apr. 30, 1957 |
| 2,874,747 | Woodall | Feb. 24, 1959 |
| 2,953,183 | Frohlich | Sept. 20, 1960 |

FOREIGN PATENTS

| | | |
|---|---|---|
| 1580/56 | Union of South Africa | May 15, 1956 |